March 8, 1966  H. F. ERDLEY  3,238,789
VIBRATING BAR TRANSDUCER

Filed July 14, 1961  3 Sheets-Sheet 1

INVENTOR:
Harold F. Erdley
By Richard F. Ehrlich
Attorney

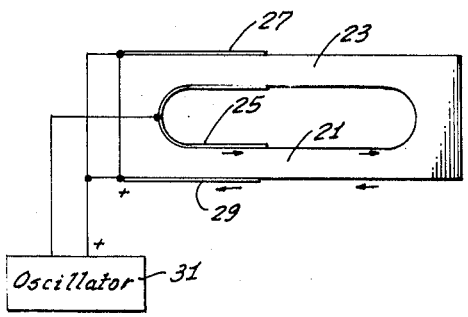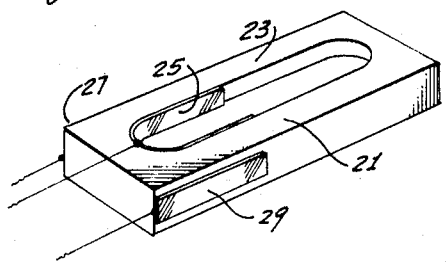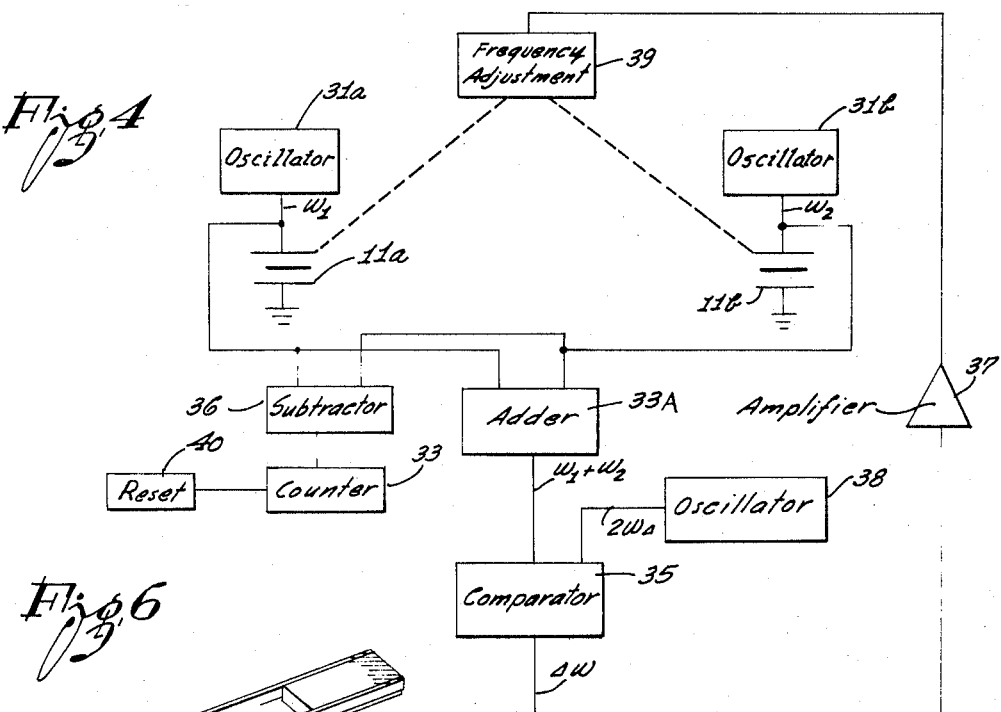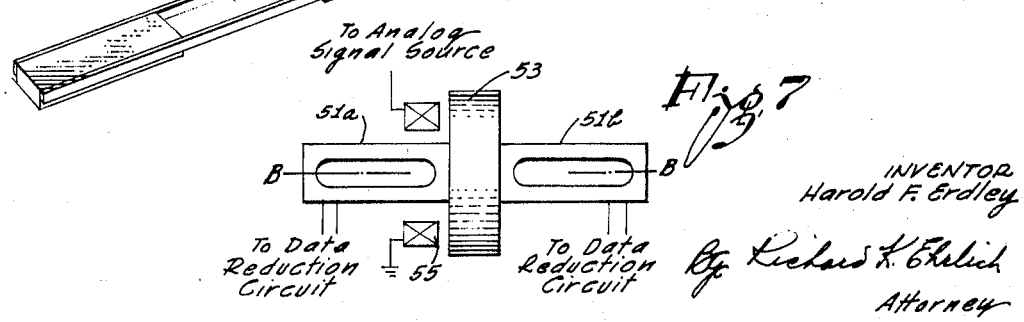

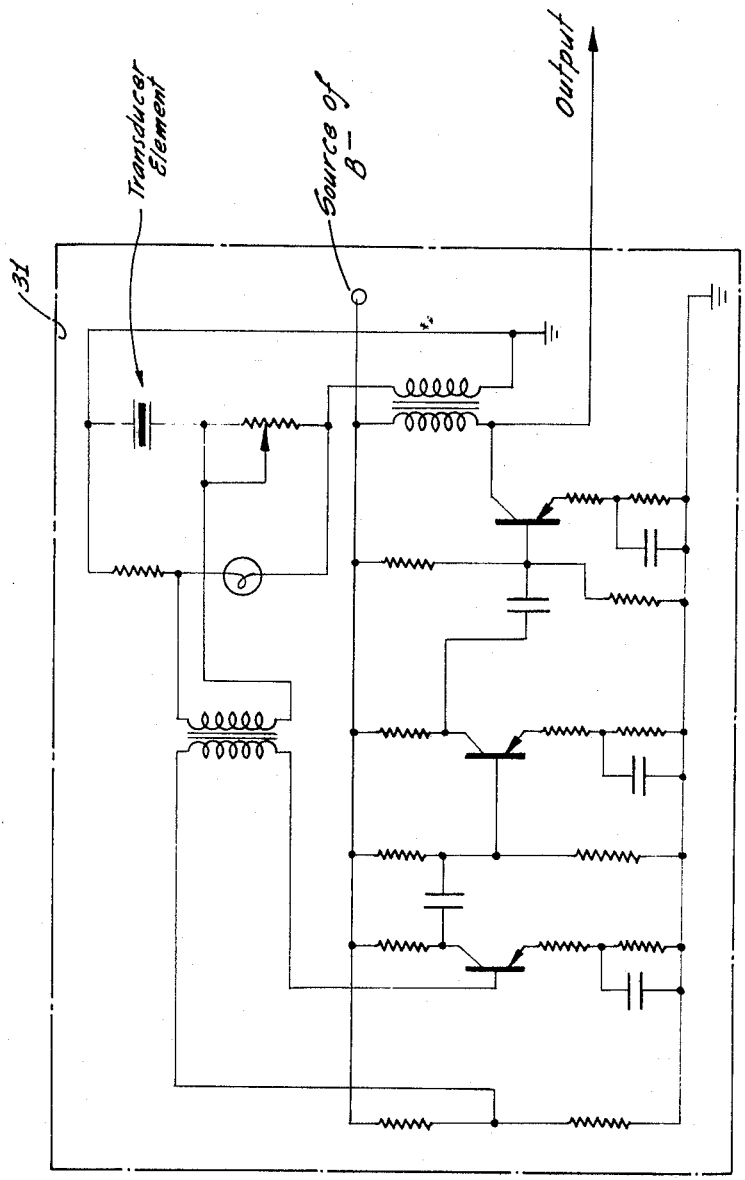

United States Patent Office 3,238,789
Patented Mar. 8, 1966

3,238,789
VIBRATING BAR TRANSDUCER
Harold F. Erdley, Pacific Palisades, Calif., assignor to Litton Systems, Inc., Beverly Hills, Calif.
Filed July 14, 1961, Ser. No. 124,173
15 Claims. (Cl. 73—517)

The present invention relates to a vibrating bar transducer and more particularly to a vibrating bar transducer having a relatively high mechanical Q and little frequency drift.

There has existed for some time in the prior art a need for an ultra precision transducer element and especially transducers of the analog-to-digital type. In particular, there is in the inertial navigation field a desperate need for an ultra precision accelerometer element capable of producing an output signal representative of applied accelerations.

In this regard, there have been numerous attempts in the prior art to fabricate such an ultra precision accelerometer but generally without success. Among the many types of prior art accelerometers is the well known vibrating wire type accelerometer. This type of instrument operates on the principle that the frequency of vibration of a wire under tension varies in accordance with the magnitude of the aixally oriented tension. Accordingly, by utilizing the longitudinal axis of the wire as a sensitive axis, axially oriented accelerations will apply forces to the wire whereby the total tension on the wire will vary, causing a change in the frequency of vibration of the wire. Hence, by sensing the variation in frequency of the vibrating wire, an output signal can be produced which is representative of the applied accelerations.

However, the vibrating wire accelerometer has a number of serious limitations. First, the wire must be maintained under a constant tensile load since variations in the load will effect the accuracy of the system. In this regard, it has been found difficult, if not impossible, to maintain the load constant. Furthermore, the characteristics of the wire and hence its resonant frequency for any given axial load vary with temperature and also with metal fatigue caused by the continuous application of the tensile load.

In addition, it has been found that the frequency characteristics of a vibrating wire also vary with the passage of time so that the wires must be continually calibrated. Also, the vibrating wire has a relatively low mechanical Q or, in other words, the energy loss per cycle is large relative to the total energy of the vibrating string, so that substantial energy must be supplied to the wire every cycle of vibration in order for the wire to continue to vibrate. As is also apparent to one skilled in the art, a relatively low mechanical Q signifies that the vibrating wire does not have a sharp resonant frequency. Accordingly, substantial frequency drifts are inherent in the vibrating wire operation. Accordingly, the vibrating wire accelerometer is, by its nature, limited in accuracy.

In addition to the inaccuracies inherent in the vibrating wire accelerometer, the accelerometer is further limited in use by the fact that it is difficult to measure the small changes in the frequency of vibration of the wire resulting from sensed accelerations. In this regard, it should also be noted that it is quite difficult to transmit to the vibrating wire the energy necessary to keep the wire vibrating.

The present invention provides a transducer element which is particularly useful as a digital accelerometer and which overcomes the foregoing enumerated and other limitations of the prior art devices. More particularly, the transducer includes a pair of rigid vibrating arms or bars interconnected at their ends in such a manner that the energy loss per cycle of vibration is substantially diminished relative to the overall energy of the vibrating system so that a vibrating system results having a relatively high mechanical Q. Furthermore, in accordance with the present invention, the Q of the accelerometer can be further increased due to the rigid nature of the vibrating device by forming the vibrating members from a high Q crystalline material, such as quartz. In addition, if a crystalline material having piezoelectric as well as high Q properties is used in the fabrication of the vibrating members, the frequency of vibration of the vibrating members can be easily ascertained by coupling an oscillator thereto.

In one embodiment of the invention, a plurality of six transducer members, each having two arms capable of experiencing vibration are intercoupled in such a manner as to produce an accelerometer measuring apparatus capable of detecting accelerations along three mutually orthogonal axes. In the acceleration measuring apparatus, the crystalline members are utilized in pairs to sense accelerations along a common sensitive axis in such a manner that one member experiences compressive loads while the other experiences tensile loads whereby the difference in the squares of the frequency between the two members is very closely directly proportional to the applied acceleration.

More particularly, each of transducer elements includes a pair of elongated bars or arms fabricated from high Q crystalline piezoelectric material and are positioned side by side and intercoupled at their ends. The arms are forced into transverse oscillation by shear stresses created within the arms by means of the application of an A.C. signal from an oscillator to the surfaces of the arms. In the absence of applied forces directed along the elongated or longitudinal axes of the arms, the arms will have no axially oriented load thereon and will vibrate at their natural resonant frequency. Furthermore, since the arms act as a frequency determining element for the oscillator, the oscillator will, in turn, oscillate and produce an electrical output signal having the same frequency as that of the vibrating arms.

Continuing, when an axially oriented compressive or tensile force is applied to the two members of a pair, the frequency of vibrations of the arms of one member will either increase or decrease slightly in accordance with whether the applied force is compressive or tensile in nature while the other member, of course, will change frequency in the opposite direction. In like manner, the frequency of oscillation of the two oscillators associated with the pair of members will change in conformity with the change in frequency of the arms so that the oscillator output signals will be representative of the applied axially oriented force. Hence, if the axially applied force is an acceleration force, the frequency of the output signals will be directly related to the magnitude of the applied acceleration and the difference of the squares in frequency between the two output signals is directly proportional to the applied acceleration. Accordingly, by generating a signal whose frequency is equal to the frequency difference and applying the signal to a counter, a digital representation of acceleration as well as velocity can be obtained.

In still another embodiment of the invention, a magnetic mass positioned in register with a voice coil is attached to a pair of transducer members in such a fashion that movement of the magnetic mass results in one member experiencing a compressive load and the other member experiencing a tensile load. Accordingly, upon application of an analog signal to the coil, the mass is attracted or repelled so that compressive and tensile loads are applied to the transducer members, the magnitude of the loads being related to the analog signal. Hence, as heretofore explained in connection with the previously described embodiment, two frequency signals are generated whose frequency squares difference is directly proportional to the magnitude of the analog signal.

It is, therefore, an object of the present invention to provide an ultra accurate transducer element.

It is another object of the present invention to provide an ultra accurate transducer element having an extremely high mechanical Q.

It is a further object of the present invention to provide an ultra accurate transducer element for converting analog signals to digital signals.

It is a still further object of the present invention to provide an ultra accurate transducer element capable of producing a digital signal representative of applied accelerations.

It is still another object of the present invention to provide an ultra accurate vibratory type transducer element having piezoelectric properties to facilitate the energization of the transducer element and to facilitate the detection of changes in vibration frequency of the transducer.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIGS. 2a and 2b are side and perspective views of a transducer element of the invention utilized in the accelerometers of FIG. 1;

FIG. 3 is a schematic view of an oscillator suitable for use with the invention;

FIG. 4 is a schematic view of a data reduction circuit utilizable in the accelerometers of the invention;

FIG. 6 is a perspective view of another type of transducer element of the invention; and FIG. 7 is a perspective view of a transducer element capable of being utilized as an analog digital converter.

Figure 1:
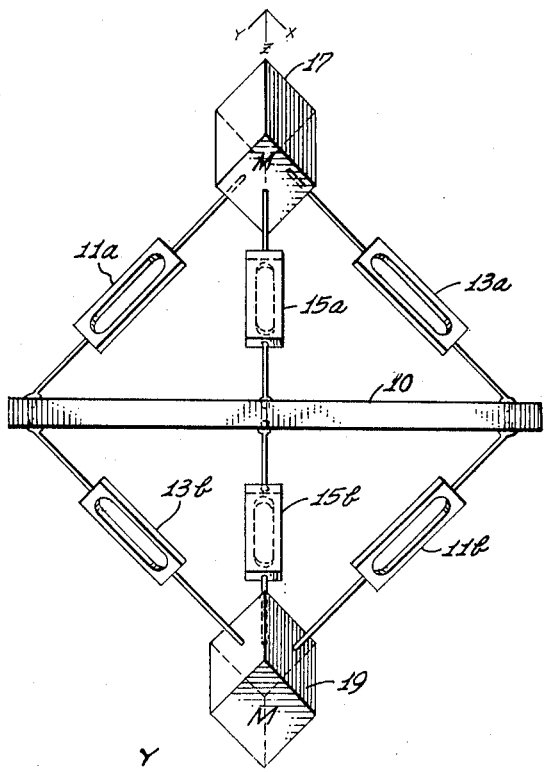
FIG. 1 is a perspective view of a three axes accelerometer mechanized in accordance with the invention.

Referring now to the drawings wherein like or corresponding parts are designated by the same reference characters throughout the several views, there is shown in FIG. 1 a three axes accelerometer of the invention capable of sensing accelerations of a frame 10 along three mutually orthogonal axes X, Y, and Z. As shown in FIG. 1, the accelerometer includes a plurality of three pairs of high transducer elements 11a and 11b, 13a and 13b, and 15a and 15b, fabricated from material having piezoelectric properties the elongated or longitudinal axis of transducer elements 11a and 11b, 13a and 13b, and 15a and 15b, being oriented and capable of sensing applied accelerations along the Y, X, and Z axes, respecively. As is further indicated in FIG. 1, one end of each of the elements is rigidly secured to frame member 10 by means of a rigid connector while the other ends of elements 11a, 13a, and 15a are connected to a proof mass 17 and the other ends of elements 11b, 13b, and 15b are connected to a proof mass 19, the effective mass of proof masses 17 and 19 being identical.

Continuing with the discussion of the invention, it is readily apparent from the examination of FIG. 1 that acceleration along any one of the sensitive axes of the accelerometers results in either a compressive or tensile load being applied to the "a" member of a pair and the opposite type load being applied to the "b" member. More particularly, considering the effect of frame 10 experiencing an acceleration along the X axis and directed toward the upper left hand corner of the figure, it is apparent that transducer element 13a will experience a compressive axially load while transducer 13b will experience a tensile load. In a like manner, it can be shown that accelerations directed toward the upper right hand corner of the figure along the Y axis will compress transducer 11a and pull transducer 11b while accelerations directed toward the top of the figure along the Z axis compresses 15a and pulls on transducer 15b. As will be hereinafter explained in detail, the fact that a compressive load is applied to one transducer of each pair in combination with a tensile load on the other member of the pair permits the accelerometer of FIG. 1 to generate a digital signal which is directly proportional to the applied acceleration.

In regard to the specific operation of the transducer element, attention is directed to FIGS. 2a and 2b wherein there is shown a side and perspective view of a transducer element of the invention typical of transducers 11 through 15. As will be noted from examination of FIGS. 2a and 2b, the transducer element includes a pair of substantially parallel arms or bars 21 and 23 which are intercoupled to one another at their ends. In addition, portions of the surface area of one side of bars 21 and 23 are covered by a common conductive coating 25 while the corresponding surface area of the opposite side of bar 23 is covered with a conductive surface 27 and the corresponding surface of the opposite side of bar 21 is covered with a conductive surface 29. As is further indicated in FIG. 2a, the conductive surfaces 27 and 29 are interconnected to one terminal of an oscillator 31 while conductive surface 25 is interconnected to the other terminal of the oscillator.

Considering that the transducer elements possess piezoelectric properties, as a result of the application of the oscillatory signal, the arms experience a modulated shear stress which, in turn, causes the arms to vibrate. For example, looking at arm 21 and considering, for example, that a negative potential is on plate 25 while there is concurrently a positive potential on plate 29, the bar near plate 25 will expand and cause tension in the direction indicated by the arrows along side 21 while the bar in the area of plate 29 will contract causing an oppositely directed tension, indicated by the arrows, to be exerted on the side of the arm or bar adjacent plate 29. Accordingly, the arm experiences a shear stress which varies sinusoidally with the A.C. signal of oscillator 31. The continuously varying shear stress forces the arm to experience transverse oscillations or, in other words, vibration about its elongated axis with a maximum deviation at its center and with nodes at the points of interconnection of the two arms of the transducer.

Applying the foregoing analysis to both arms of the transducer element, it is apparent that both arms will vibrate in phase concurrently bulging outwardly and inwardly at the resonant frequency of the transducer element. In this regard, it should be noted that because of the interconnection of the two vibrating arms at their nodes, a relatively small amount of energy is lost during each cycle of vibration. Accordingly, the configuration of the element results in the transducer possessing a relatively high mechanical Q. It should be noted in this regard that the general configuration of the transducer element can be considered as somewhat similar to that of a conventional tuning fork, which, of course, has a high mechanical Q, since the transducer element can be viewed as two tuning forks merged together to form a substantially rectangular member.

As is apparent from the fact that the transducer has a high Q, arms 21 and 23 will vibrate at a predetermined frequency with great accuracy so long as the natural frequency of the transducer element is not changed by some external event such as the application of an external force along the axis A—A of the element. As has been heretofore explained, upon the application of an axially oriented force, the frequency of vibration of the arms changes, the magnitude of the frequency change being dependent upon the magnitude of the applied acceleration while whether the frequency increases or decreases is dependent upon the polarity of the applied acceleration.

Considering the effect of the change in the frequency of vibration of the transducer arms on the operation of oscillator 31, attention is directed to FIG. 3 wherein there is shown a detailed schematic view of one type of oscillator suitable for use as oscillator 31. In this regard, it should be noted that while there is shown in FIG. 3 a transistorized form of the well-known Meacham-Bridge stabilized oscillator circuit, it will be apparent to those skilled in the art that numerous other well-known oscillator circuits can be used to mechanize oscillator 31. Accordingly, it is to be expressly understood that the invention is not limited to any particular type of oscillator circuit.

As is indicated in FIG. 3, the transducer element can be thought of as not only coupled to the oscillator but as part of the oscillator circuit in as much as the transducer determines the frequency of oscillation of the oscillator circuit and hence the frequency of the oscillator output signal. More particularly, the electrical properties of the transducer are related to the frequency of vibration of the arms of the transducer so that the transducer insures that the oscillator is tuned to the same frequency as that of the vibration arms of the transducer. Accordingly, by sampling the frequency of the oscillator output signal, the changes in frequency of vibration of the arms can be easily ascertained, an increase in frequency indicating the application of an acceleration having one polarity and a decrease in frequency indicating the application of an acceleration of the opposite polarity.

Considering with more detail the transducer vibration frequency relative to applied accelerations, it can be shown that if $w_0$ is the frequency of vibration of the arms in the absence of any applied forces on the arms, $w_1$ is the frequency of vibration of the transducer experiencing compression while $w_2$ is the frequency of vibration of the transducer experiencing tension, S is the magnitude of the applied axial forces, and K is a constant of the transducer, then:

$$w_1^2 = w_0^2 - KS \quad (1)$$

$$w_2^2 = w_0^2 + KS \quad (2)$$

If Equations 1 and 2 are combined and simplified, it can be shown that:

$$w_1 - w_2 = \frac{2KS}{(w_2 + w_1)} \quad (3)$$

Considering Equation 3, it is evident that the difference in vibration frequency of the two transducers is directly proportional to the applied axial load acceleration S and is inversely proportional to the sum frequency $(w_2+w_1)$. Accordingly by mechanizing the accelerometer in such a fashion that the sum frequency $(w_2+w_1)$ is constant throughout the range of applied accelerations, the difference frequency $(w_1-w_2)$ will be directly proportional to the applied axial acceleration.

Referring now to FIG. 4, there is shown a schematic view of a data reduction circuit suitable for use with each pair of accelerometers and including a closed loop control system to maintain the sum $(w_2+w_1)$ constant so that the difference frequency $(w_1-w_2)$ is directly proportional to the applied axial accelerations. In addition, the data reduction circuit includes a digital readout unit including a subtractor 36 for generating $(w_1-w_2)$ and a counter 33 which is periodically reset by reset circuit 40, the counter providing a readout just prior to each reset period that is proportional to applied axial accelerations. As is evident from FIG. 4, the data reduction circuit is shown as being associated with transducers 11a and 11b. It should be noted, however, that the same type of data reduction circuit is suitable for use with transducers pairs 13a and 13b, and 15a and 15b.

As is indicated in FIG. 4, oscillators 31a and 31b coupled to transducers 11a and 11b, respectively, are operable to produce output signals $w_1$ and $w_2$ corresponding to the oscillatory frequency of the arms of transducers 11a and 11b, respectively. As is further indicated in the figure, output signals $w_1$ and $w_2$ are applied to an adder circuit 33A which adds the two signals to produce an output signal corresponding to the sum frequency $(w_1+w_2)$ which is, in turn, applied to a comparator 35. Comparator 35 is operable to compare the sum frequency $(w_1+w_2)$ with a standard or predetermined frequency generated by oscillator 38 which could be, for example $2w_0$, and to produce an output signal $\Delta w$, proportional to the difference in frequencies of $(w_1+w_2)$ relative to $2w_0$, and to apply the signal to an amplifier 37. Amplifier 37 amplifies the difference signal $\Delta w$ and as is shown in FIG. 4, the amplified signal $\Delta w$ is applied to a frequency adjustment device 39 which is responsive to the difference frequency signal $\Delta w$ for, applying tensile or compressive force to both transducers 11a and 11b in such a manner that the transducer vibratory frequencies are caused to shift until $(w_1+w_2)$ is equal to the predetermined comparison frequency of $2w_0$ from oscillator 42 whereby $\Delta w$ tends to approach zero.

Continuing with the discussion of the invention, numerous ways of mechanizing frequency adjustment apparatus 39 will be apparent to one skilled in the art. More particularly, apparatus similar to the speaker coil and corresponding magnetic mass structure described hereinafter in connection with another embodiment of the invention could be modified to convert the analog signal $\Delta w$ to the appropriate compensating compressive or tensile load. It should be noted, however, that in mechanizing the frequency adjustment apparatus, both transducers should experience the same type of load concurrently. For example, either a compressive load should be applied to both transducers or a tensile load should be applied to both transducers in order to achieve the desired compensation result.

Referring now to the overall operation of the three axes accelerometer shown in FIG. 1, it is apparent that due to the inertia of masses 17 and 19, accelerations applied to frame 10 will cause two or more of the transducer elements to experience compressive and tensile axial loads. For example, an acceleration oriented along the X axis will place a tensile load on one of the transducers of pair 13 and a compressive load on the other. As has been hereinbefore explained, the frequency of vibration of the arms of transducers 13a and 13b will be varied in accordance with the magnitude and type of load applied to the transducer, the frequency of one transducer increasing while that of the other decreases. As has also been hereinbefore explained in connection with FIG. 4, the servo loop corresponding to the transducer pair adds the two frequencies and compares the sum to a predetermined frequency level such as twice the resonant frequency of the unloaded transducer elements, and produces a signal representative of the difference. This difference signal is, of course, driven to zero by the servo loop system by applying corrective axial forces to the transducer elements so that the sum of the frequencies of vibration of the two transducers of the pair is constant. Hence, in accordance with Equation 3, $(w_1-w_2)$ is directly proportional to the applied acceleration. Accordingly, by applying the frequency difference $(w_1-w_2)$ to counter 38, a digital signal is produced whose value corresponds to the applied acceleration. It should be noted that the accelerometer of FIG. 1 can be easily converted to a velocity meter by simply omitting the periodic resetting of counter 38 whereby the counter will set forth in digital form the velocity of frame 10.

Figure 5:
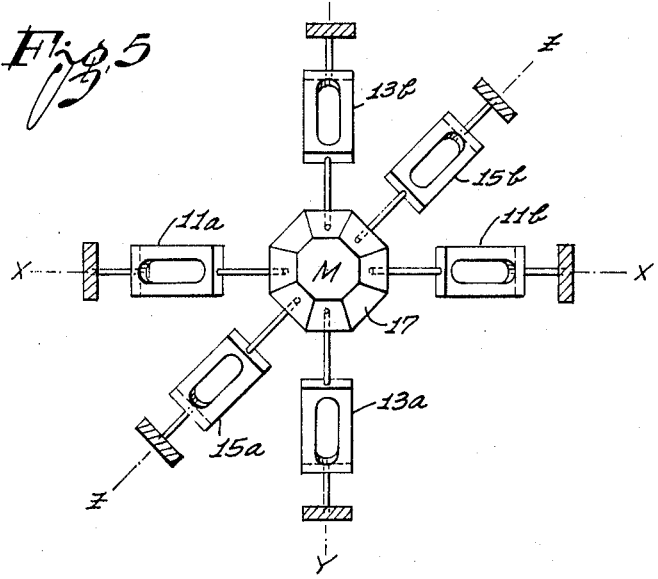
FIG. 5 is another embodiment of a three axes accelerometer of the invention.

It should be noted that the novel configuration of the embodiment shown in FIG. 1 permits the proof masses 17 and 19 freedom of movement so that dimensional changes due to temperature variations can be tolerated. In those applications where the accelerometer structure is not exposed to substantial temperature variation, another embodiment of a three axes accelerometer of the invention shown in FIG. 5 can be used, the configuration of this embodiment being somewhat simplified relative to the first embodiment of the invention. As is indicated in FIG. 5, the embodiment of the invention utilizes only one proof mass 17 supported between the transducers making up each pair.

In view of the foregoing comments, it will be apparent to one skilled in the art that numerous modifications can be made in the transducer elements and accelerometers fabricated therefrom without departing from the spirit and scope of the invention. For example, the transducer element may be fabricated from a number of pieces of crystalline material such as quartz and cemented together in the desired configuration as is shown in FIG. 6 rather than being made from one integral piece of quartz as is shown in FIGS. 2a and 2b. Furthermore, the transducers can be utilized in many types of acceleration measuring devices such as a weight measuring or scale device or can be used for an entirely different purpose such as the conversion of an analog-to-digital signal.

Referring now to FIG. 7 wherein there is shown an analog-to-digital converter utilizing transducer elements of the invention, a pair of transducer elements 51a and 51b are positioned in such a manner as to have a common elongated axis B—B and are further rigidly affixed to a proof mass 53 positioned between the transducer elements. Hence, movement of proof mass 53 along the axis B—B results in a compressive load being applied to one transducer element while a tensile load of the same magnitude is concurrently applied to the other element. As is further shown in FIG. 7, a speaker coil 55 is positioned in register with proof mass 53 but is independently suspended so that the proof mass and transducer elements are capable of movement relative to speaker coil 55.

Accordingly, upon application of an analog signal to coil 55, proof mass 53 will be attracted or repulsed along axis B—B from or toward the coil whereby a compressive load is applied to one transducer and a tensile load is applied to the other transducer, the magnitude of the tensile and compressive loads being equal and corresponding to the analog signal.

As has been heretofore explained, the frequency of vibration of the arms of transducers 51a and 51b will be increased and decreased in accordance with the nature of the analog signal so that by intercoupling transducers 51a and 51b in a circuit of the type shown in FIG. 4, in place of the transducers 11a and 11b of FIG. 4, a digital signal will be produced at counter 38 corresponding to the analog signal.

It is to be expressly understood, of course, that numerous modifications and alterations may be made in the analog-to-digital converter as well as to other instruments of the invention herein disclosed with that departing from the basic concept of the invention. For example, the analog-to-digital converter shown in FIG. 7 is not limited to a converter using two transducer elements. For example, the converter could be mechanized with just one transducer element. However, certain modifications would have to be made in the circuitry shown in FIG. 4 in order to produce an accurate digital signal. In addition, it should be noted that coil 55 could be affixed to transducers 51a and 51b and magnet 53 separately suspended rather than as shown in FIG. 7. Accordingly, the scope of the invention is to be limited only by the spirit and scope of the appended claims.

What is claimed as new is:

1. In a transducer element, the combination comprising:
    a pair of bars capable of vibrating about their longitudinal axes and rigidly interconnected at a displacement node only, to permit independent movement of said bars;
    means for applying compressive and tensile axially oriented forces to the ends of said bars to stress both bars substantially equally;
    and means for setting said bars into resonant vibration, in substantially 180° phase opposition, transverse to their longitudinal axes, the frequency of vibration being representative of the forces applied to said bars.

2. In an analog to digital converter for converting an analog signal to a digital signal, the combination comprising:
    a member including a pair of stiff unitary arms capable of separate oscillation, said arms being interconnected and in direct contact with each other at displacement nodes only;
    means positioned adjacent said member and responsive to the analog signal for mechanically applying substantially equal axially oriented forces on said arms;
    oscillating means coupled to said member for causing said arms to vibrate, in substantially 180° phase opposition, at their resonant frequency, the frequency of vibration of said arms being representative of the analog signal; and
    means coupled to said member responsive to the frequency of vibration of said arms to generate the digital signal having a magnitude representative of the frequency of vibration of said arms.

3. The combination defined in claim 2 wherein said oscillating means further includes apparatus for generating an A.C. signal, the frequency of said A.C. signal corresponding to the frequency of vibration of said arms.

4. The combination defined in claim 2 wherein said member has a high mechanical Q and piezoelectric properties.

5. In an accelerometer, the combination comprising: a sensing member including a pair of arms capable of separate oscillation, the oscillation of said arms being phased such that said arms always move in opposite directions, the longitudinal axes of said arms being substantially parallel; means responsive to axially oriented acceleration of said member for axially stressing said arms in accordance with the magnitude of the axial acceleration; and oscillatory means coupled to said member for causing said arms to vibrate at the resonant frequency of vibration of said arms, the resonant frequency being representative of axially oriented accelerations applied to said member.

6. In a transducer, the combination comprising: a pair of first and second members, each including a pair of arms capable of oscillation; mounting means for mounting said members to receive externally applied forces to be measured in such a manner that compressive and tensile loads are concurrently applied to the first and second members, respectively; and first and second oscillating means coupled to said first and second members, respectively, for causing said arms of each of said members to vibrate, in substantially 180° phase opposition, the frequency of vibration of said first member, $w_1$, being equal to $\sqrt{w_0^2-KS}$ and the frequency of vibration of said second member, $w_2$, being equal to $\sqrt{w_0^2+KS}$ wherein $w_0$ is the resonant frequency of said arms of said members when no load is applied thereto, S represents the magnitude of the applied forces to be measured, and K is a constant of proportionality; controlling means for maintaining the sum of frequency $w_1$ and $w_2$ at substantially a constant value; subtraction means coupled to said first and second oscillating means for producing an output signal proportional to $w_1$ and $w_2$); and compensating means coupled to said first and second oscillating means for comparing the magnitude of the sum of the frequencies ($w_2+w_1$) with a predetermined frequency and for applying a compressive or tensile load concurrently to both of said first and second members to maintain ($w_2+w_1$) constant whereby ($w_1-w_2$) is directly proportional to the force to be measured S.

7. In an analog-to-digital converter for converting an analog signal to a digital signal, the combination comprising: a first member including a pair of rigid arms each capable of oscillating separately about its longitudinal axis, said arms being interconnecetd at a displacement node; a magnetic mass connected to said member and a coil positioned in registry with said magnetic mass, the analog signal being applied to said coil to magnetically push said magnetic mass to mechanically load said member with axially oriented compressive and tensile loads in accordance with the magnitude of the analog signal; oscillating means coupled to said member causing said arms to vibrate, in 180° phase opposition, the frequency of vibration of said arms being determined by the axially oriented loads applied to said means; signal generating means coupled to said member for generating a frequency signal having a frequency corresponding to the frequency of vibration of said arms and a counter responsive to said frequency signal for generating the digital signal having a value related to the frequency of said frequency signal.

8. In a transducer element, the combination comprising: a member having piezoelectric properties and a high mechanical Q and including a pair of rigid arms capable of separate oscillation, in substantially 180° phase opposition, said arms being rigidly interconnected, affixed, and in contact with each other at a displacement node; means positioned adjacent said member for exerting axially oriented forces to be measured on said arms; a source of an oscillating electrical signal; and conductive surfaces formed on said arms and connected to said source of said oscillating electrical signal to cause said arms to vibrate, the frequency of vibration of said arms and the frequency of oscillation of said electrical signal being related to the forces to be measured.

9. In a transducer, the combination comprising: a pair of first and second members having a high mechanical Q and piezoelectric properties, each member including a pair of arms, each arm capable of separate oscillation, each pair of arms being connected together at a nodal point to elastically couple the pair of arms for common frequency of vibration of both arms in substantially 180° phase opposition to receive externally applied forces to be measured in such a manner that compressive and tensile loads are concurrently applied to the first and second members, respectively, and vice versa; conductive surfaces positioned adjacent said arms of said members; and first and second oscillating means coupled to said conductive surfaces positioned adjacent said first and second members, respectively, for actuating said arms of said first and second members, to cause said first member to vibrate at a frequency, $w_1$, which is equal to $\sqrt{w_0^2-KS}$, and to cause said second member to vibrate at a frequency, $w_2$, which is equal to $\sqrt{w_0^2+KS}$ wherein $w_0$ is the resonant frequency of said arms of said members when no load is applied thereto, S represents the magnitude of the forces to be measured applied to said arms, and K is a constant of proportionality.

10. The combination defined in claim 9 wherein said conductive surfaces are positioned adjacent said arms of said members for causing said arms to expand and contract in accordance with their piezoelectric properties to develop shear loads on said arms whereby said arms are forced into transverse vibration, the forces to be measured S being axially applied to said members.

11. In a transducer element for indicating the magnitude of an applied force, the combination comprising:
a member comprising a pair of separated bars composed of piezoelectric material, each of said bars being capable of vibration transverse to its longitudinal axis and each of said bars having first and second end regions at opposite ends thereof, and a first rigid body contacting and interconnecting said first end regions of both bars and a second rigid body contacting and rigidly interconnecting said second end regions of both bars so that reactions due to vibration of said bars substantially cancel in the rigid bodies connecting said end regions;
means for stressing said bars of said member in accordance with the magnitude of the applied force, said means being connected to said member by said first and second rigid bodies and being responsive to application of the applied force for exerting force on said rigid bodies to axially stress said bars in accordance with the magnitude of the applied force; and
means electrically coupled to said first and second bars for vibrating said bars, in substantially 180° phase opposition, at their resonant frequency of vibration, the change in resonant vibration frequency of said arms in response to the applied force being representative of the magnitude of the applied force.

12. The combination defined by claim 11 wherein said rigid bodies interconnecting said end regions of said member comprise substantially nodal regions of displacement of said member.

13. The combination defined by claim 12 wherein said rigid bodies interconnecting said end regions are composed of piezoelectric material.

14. The combination defined by claim 13 wherein said rigid bodies are integral with said bars.

15. In a transducer element for indicating the magnitude of an applied force, the combination comprising:
a member comprising a pair of separated bars composed of piezoelectric material, each of said bars being capable of vibration transverse to its longitudinal axis and each of said bars having first and second end regions at opposite ends thereof, and a first rigid body of piezoelectric material, integral with said bars, rigidly interconnecting said first end regions of both bars at substantially nodal regions of displacement of said member, and a second rigid body of piezoelectric material, integral with said bars rigidly interconnecting said second end regions of both bars at substantially nodal regions of displacement of said member so that reactions due to vibration of said bars substantially cancel in the rigid bodies connecting said end regions;
means for stressing said bars of said member in accordance with the magnitude of the applied force, said means being connected to said member by said first and second rigid bodies and being responsive to application of the applied force for exerting force on said rigid bodies to axially stress said bars in accordance with the magnitude of the applied force; and
conductive surfaces formed on said bars and an electrical oscillator connected to said conductive surfaces to electrically excite vibration of said bars at substantially equal resonant frequencies and phased such that said bars always move in opposite directions, towards and away from each other, so that reaction forces substantially fully cancel in said rigid bodies interconnecting said bars, the change in resonant vibration frequency of said bars in response to the applied force being representative of the magnitude of the applied force.

References Cited by the Examiner

UNITED STATES PATENTS

| | | | |
|---|---|---|---|
| 2,598,516 | 5/1952 | Dickinson | 235—154 |
| 2,753,173 | 7/1956 | Barnaby | 73—505 |
| 2,942,779 | 6/1960 | Wood | 235—154 |
| 2,984,111 | 5/1961 | Kritz | 73—51 |
| 3,019,641 | 2/1962 | Shapiro | 73—141 |
| 3,057,208 | 10/1962 | Bedford | 73—517 |

FOREIGN PATENTS

| | | |
|---|---|---|
| 861,325 | 2/1961 | Great Britain. |
| 871,553 | 6/1961 | Great Britain. |

RICHARD C. QUEISSER, *Primary Examiner.*

WALTER W. BURNS, Jr., JOSEPH P. STRIZAK, JAMES J. GILL, *Examiners.*